United States Patent [19]
Daly

[11] Patent Number: 4,896,534
[45] Date of Patent: Jan. 30, 1990

[54] FLOAT-TYPE FLOWMETER

[76] Inventor: Daniel C. Daly, 38 Lindsay St., Dorchester, Mass. 02124

[21] Appl. No.: 274,200

[22] Filed: Nov. 21, 1988

[51] Int. Cl.$^4$ ............................................. G01N 1/02
[52] U.S. Cl. ...................................... 73/189; 73/181; 73/861.55
[58] Field of Search ................ 73/861.57, 861.55, 181, 73/189, 188

[56] References Cited

U.S. PATENT DOCUMENTS

| | | | |
|---|---|---|---|
| 2,554,634 | 5/1951 | Paine | 73/212 |
| 2,779,194 | 1/1957 | Slettenmark | 73/209 |
| 2,993,374 | 7/1961 | Dwyer et al. | |
| 3,049,008 | 8/1962 | Polster | 73/188 |
| 3,633,421 | 1/1972 | Phillips | |
| 3,675,481 | 7/1972 | Phillips | |
| 3,926,594 | 12/1975 | Seib | 55/159 |
| 4,137,781 | 2/1979 | Andrus | 73/707 |
| 4,227,406 | 10/1980 | Coffey | 73/188 |
| 4,317,375 | 3/1982 | Egert | |
| 4,317,376 | 3/1982 | Fitzpatrick | |
| 4,402,220 | 9/1983 | Kuhlmann et al. | 73/188 |
| 4,437,425 | 3/1984 | Unéden | 73/188 |
| 4,559,834 | 12/1985 | Phillips et al. | |
| 4,559,836 | 12/1985 | Coleman | 73/861.66 |

FOREIGN PATENT DOCUMENTS

| | | | |
|---|---|---|---|
| 238064 | 3/1962 | Australia | 73/181 |

*Primary Examiner*—Joseph A. Orsino
*Assistant Examiner*—Hollis T. Chen
*Attorney, Agent, or Firm*—Edward W. Porter

[57] ABSTRACT

A float-type flowmeter has a flow detecting surface, such as a fin, for pointing its inlet opening, which receives a portion of the flow to be measured, into the flow. Preferably the flowmeter, its inlet opening, and its fin, are all mounted to rotate as a unit, and the flowmeter is designed for measuring wind velocity on sailboats. This flowmeter is designed to be mounted on, and rotated around, a mast supporting wire, such as a shroud. The flowmeter should have counterweight so that gravity will not tend to prevent it from rotating around its wire when that wire is tilted. Similarly the inlet opening should be relatively small compared to the cross section of the float chamber, so that as the flowmeter tilts, the area of the inlet opening projected into a horizontal wind flow will decrease wind flow into the flowmeter, so as to compensate for the tilt. Preferably the flowmeter is designed so its float will not be visually obscured from upwind by the elongated structure around which it rotates. Both the wall of the float chamber and the surface of the float contain acrylic to reduce the tendency of the float to gather electro-static charge. It is also preferred that the wind meter has an intermediate opening between the bottom and top end of its float chamber so that more wind flows through the bottom part of the float chamber than the top, making the bottom part more sensitive to air flow.

13 Claims, 8 Drawing Sheets

FLOAT-TYPE FLOWMETER

FIELD OF THE INVENTION

The present invention relates to float-type flowmeters in general, including float-type flowmeters for measuring wind velocity, and, in particular, including float-type flowmeters for measuring relative wind velocity on sailboats.

BACKGROUND OF THE INVENTION

Float-type flowmeters are well known in the prior art, as is indicated by U.S. Pat. No. 2,993,374 to Dwyer et al, issued July, 25th, 1961. When positioned for operation, such flowmeters usually include a float chamber which extends in a substantially vertical direction between a first, bottom, end and a second, top, end. The float chamber is shaped so its cross-sectional area in the horizontal plane increases from its bottom end toward its top end. The flowmeter includes an inlet opening which is positioned to receive a portion of the flow of fluid which is to be sampled or measured. It also includes means for channeling the sampled portion of the flow received by the inlet opening into the bottom end of the float chamber. An outlet opening is provided for releasing at least a part of the sampled flow from the top end of the chamber.

A float is located in the float chamber. It is designed to move between the bottom and top ends of the chamber. The float is pulled by gravity toward the bottom end and is pushed toward the top end by the sampled flow. It will tend to reach an equilibrium position when the force of gravity pushing the float down equals the force of the net pressure of the sampled flow pushing the float up. The net pressure pushing up on the float is a function of the difference between the fluid pressure below the float pushing up and that above the float pushing down. This difference in pressure varies as a function of the cross-sectional area which the sampled flow has to flow around the float. Since the cross-sectional area of the chamber increases as the float moves up, the cross-sectional area for the fluid to flow around the float also increases as the float moves up the chamber, decreasing the net pressure pushing up on the float for a given volume of fluid flow in the chamber. Thus the float tends to find an equilibrium position which indicates the volume of flow being measured.

Usually such flow chambers have transparent sides so that the position of the float can be seen by a user of the flowmeter, and usually the chamber has calibration marks placed on its exterior so that the position of the float can be read as indicating a given calibrated flow velocity.

Such float-type flowmeters are often used to measure a flow which travels in a fixed direction, such as the flow of fluids through pipes. But as the Dwyer patent cited above indicates, such flowmeters have been used as wind meters. They have many benefits when used as wind meters, such as the fact that they can be relatively small, light, and inexpensive, thus making them ideal for portable wind meters. However, such prior art float-type wind meters require the person using them to hold them and point their inlet opening into the wind in order to function properly. Such hand held wind measuring devices are often impractical for sailboats because sailors are often occupied with attending to various manual operations, such as manning the tiller and adjusting the sheets. These operations become even more crucial in racing, in which reaching for a hand-held device and then adjusting its position to point into the wind can be impractical. Also , a hand-held device, when not in use, can become a loose item in a heeling sailboat, making it difficult to keep at hand and posing a hazard if it gets under foot.

Some prior art float flowmeters, such as that disclosed in the Dwyer patent cited above, include means for enabling the device to give readings of wind velocity over an extended range of wind speeds. The Dwyer device does this by having two outlet openings, one of which is relatively large, and one of which is relatively small. If the device is measuring relatively low wind speeds, both opening are left open, allowing a larger volume of air to flow up through the float chamber. But if the user of the flowmeter wants to measure higher wind speeds, he or she puts his or her finger on the large outlet opening, leaving only the smaller opening to release air from the float chamber. This greatly reduces the air flowing up the float chamber, and allows much higher wind speeds to be measured. This use of two separate openings at the top end of the flow tube does let the wind meter measure wind speeds over a broad range of wind speeds, but it requires the user to cover up the large opening to measure high winds.

SUMMARY OF THE INVENTION

It is an object of the present invention to provide a float-type flowmeter which does not require a user to point it into the direction of flow when that direction changes.

It is another object of the present invention to provide a float-type wind meter which indicates not only wind speed but also apparent wind direction.

It is a further object of the present invention to provide a float-type wind meter which is convenient for use on sailboats, and, in particular, which can operate without requiring a human to hold it during its operation and give relatively accurate readings, despite heeling of the sailboat.

It is a further object of the present invention to provide a flowmeter which can measure winds over a relatively broad range without requiring a user to touch the wind meter.

It is yet a further object of the present invention to provide a wind meter which is relatively simple in construction and yet which provides relatively good indications of both wind speed and apparent wind direction.

The present invention relates to improvements in float-type flowmeters of the general type described above in the background of the invention. According to one aspect of the invention the improvement includes providing such a float-type flowmeter with means for rotatably mounting the inlet opening of such a flowmeter so that it can be rotated to face into the flow of the fluid whose flow rate is being measured. Such a flowmeter includes a rotatably mounted deflection surface, which can be deflected by the flow so as to minimize its resistance to that flow, and means for mechanically linking the deflection surface and the inlet opening so that when the deflecting surface is rotated so as to minimize its resistance to the flow, the inlet opening is rotated to face into the flow.

In a preferred embodiment the float chamber, the inlet openings and the deflection surface are all constructed and connected so as to rotate as one unit, and they are mounted to rotate around the axis of a structure which is elongated in a direction having a vertical component, such as a mast supporting shroud of a sailboat. In one embodiment, the float chamber of the flowmeter is mounted on one side the of the elongated structure and between 30 and 70 percent of the weight of the flowmeter is located on the other side of the elongated structure. Such a provision of a counterweight for the float chamber makes it easier for the flowmeter to rotate about the elongated structure regardless of that structure's tilt.

Preferably the float chamber and the majority of the deflection surface are mounted on the same side of the elongated structure, so that when the flowmeter is laced in a flow the majority of the deflection surface and the float chamber are both deflected to the downstream side of the elongated structure. In the preferred embodiment the float chamber is comprised of an elongated chamber which has an axis designed to extend in a direction parallel to the elongated structure about which the flowmeter is designed to rotate. In such a structure the inlet opening is comprised of one or more openings, each of fixed area, the projection of which into the direction of a horizontal flow is maximized when the axis of the float chamber is vertical, and decreases as the axis of the float chamber tilts toward the horizontal. The total area of the inlet openings is sufficiently small relative to the narrowest cross section of the float chamber so that when the flowmeter is tilted, the decrease in the projection of the area of the openings onto the plane perpendicular to the horizontal flow noticeably decreases the flow in the float chamber, so as to compensate for the tilt. Preferably the flowmeter is designed so its float chamber will be positioned relative to an elongated structure around which it is mounted so that when the flowmeter is rotated by the wind, its float will not be obscured to one looking at the flowmeter from upwind by the elongated structure.

According to another aspect of the invention, an improved float-type flowmeter used to measure the velocity of the flow of gas is characterized in that the float chamber of the flowmeter has walls made of an acrylic plastic, and the float used in that chamber has a surface containing acrylic plastic to reduce the tendency of the float to develop a static electric charge as it moves in the chamber.

According to another aspect of the invention, an improved float-type flowmeter is provided which is characterized in that it includes an intermediate opening, located in the float chamber between its bottom and top ends, for releasing a part of the sampled flow which is not released through the outlet opening at the chamber's top end. This causes a given sampling flow to push up harder against the float in the part of the chamber below the intermediate opening than it does in the part above that opening.

DESCRIPTION OF THE DRAWINGS

These and other aspects of the present invention will become more clear upon reading the following description of the preferred embodiment in conjunction with the accompanying drawings, in which.

DETAILED DESCRIPTION OF PREFERRED EMBODIMENTS

Figure 1:
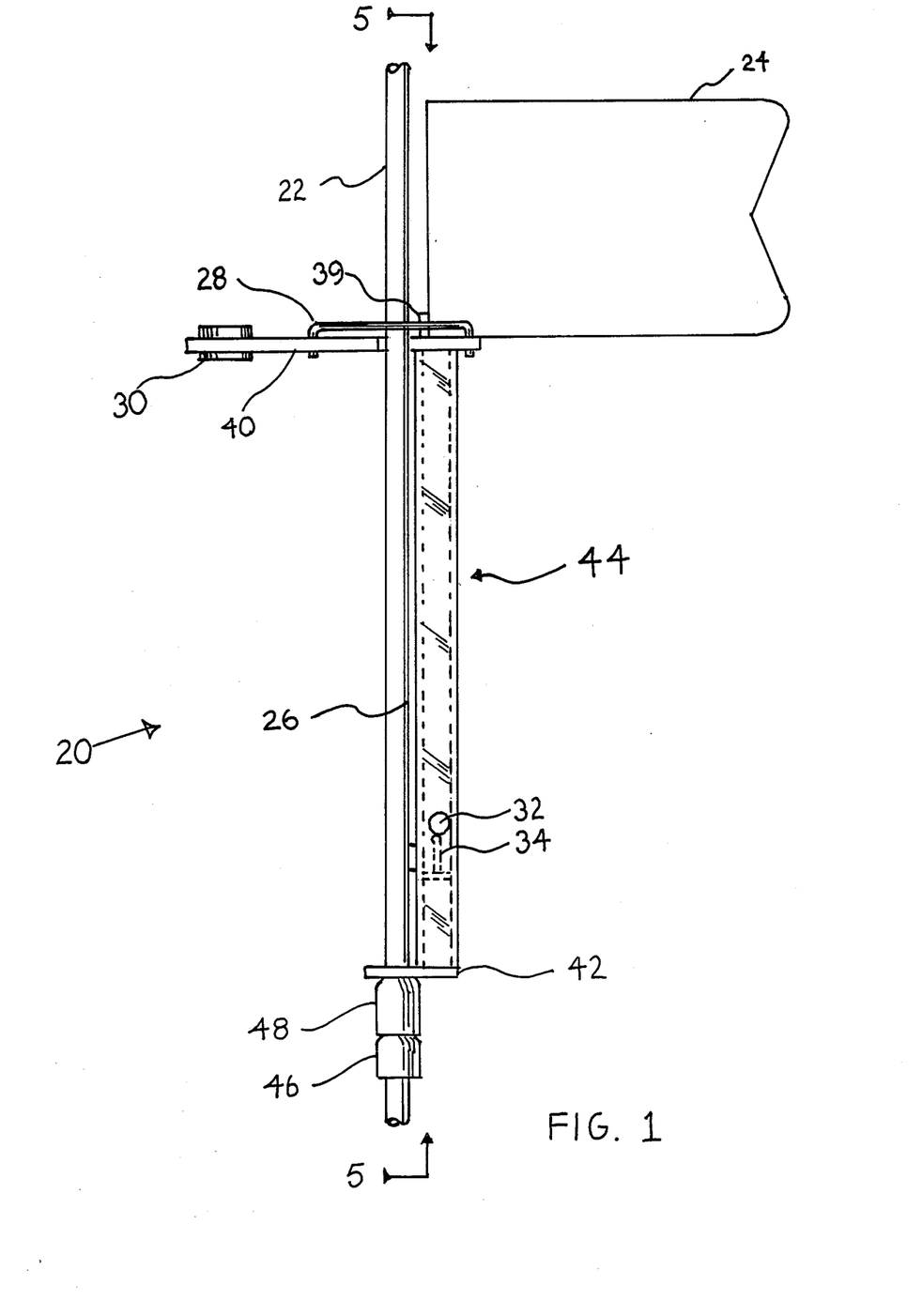
FIG. 1 is a side view of a wind meter constituting a preferred embodiment of the present invention, showing that wind meter mounted to rotate around an elongated wire or rod.

Referring now to FIG. 1, a preferred embodiment of a float-type flowmeter which embodies the current invention is shown. In the preferred embodiment the flowmeter is a wind meter 20, which is designed to be mounted on a mast supporting wire, such as the shroud wire 22 shown in FIG. 1, so as to rotate about that wire. In this specification and the claims that follow the word "wire" is intended to include wires and cables used in the rigging of sailboats, and to include rods or other elongated structures which might be used as part of the length of those wires.

In the preferred embodiment shown in the figures, the wind meter is made almost entirely of a relatively rigid transparent plastic, such as a acrylic plastic, which is glued together with a transparent cement. In fact, the only portions of the wind meter which are not made of such transparent plastic are the fin 24, the locking pin 28, the counterweight 30, the float 32, the float supporting pin 34, and the calibration marks 36 and paint 38 (shown in FIG. 4) which are placed over certain portions of the wind meter. In other embodiments of the invention, a vinyl stencil could be used instead of paint to cover the portions of the wind meter which are covered by the paint 38 in the embodiment shown.

A deflection surface, in the shape of a fin 24, is connected in fixed manner to the rest of the wind meter so that when a wind blows upon the fin 24, the front side 26 of the wind meter 26 is rotated into the wind. The fin 24 is made of a thin, opaque plastic, such as polyvinyl chloride. It is held in place by being glued to a block of rigid plastic 39, which in turn is glued to the wind meter's top plate 40. The wind meter also includes a bottom plate 42, which is parallel to the top plate. Between the top and bottom plates is located the main body 44 of the wind meter.

The counterweight 30 is provided so that the weight of the flowmeter will be approximately evenly divided between both sides of the wire 22, so that if the wire is tilted away from the vertical direction, gravity will not tend to prevent the wind meter from rotating freely about that wire 22. It is not necessary that the division of weight be exactly equal, and as long as, for example, thirty to seventy percent of the total weight of the flowmeter is on the opposite side of the wire from the main body 44 of the flowmeter which includes its float chamber, the meter will tend to rotate fairly well. But, of course, it will rotate best if the weight on both sides of the wire is approximately equal.

The wire 22 should have on it a supporting surface 46, to support the wind meter 20 at a location part of the way up the wire 22. This supporting surface can be formed by welding or cementing a metal cylinder to the wire 22, or by wrapping multiple layers of waterproof rigging tape around it. Preferably a rotatable washer 48 is placed between the supporting surface 46 and the bottom plate 42 so as to minimize the friction between the surface 46 and the bottom plate 42.

Figure 2:
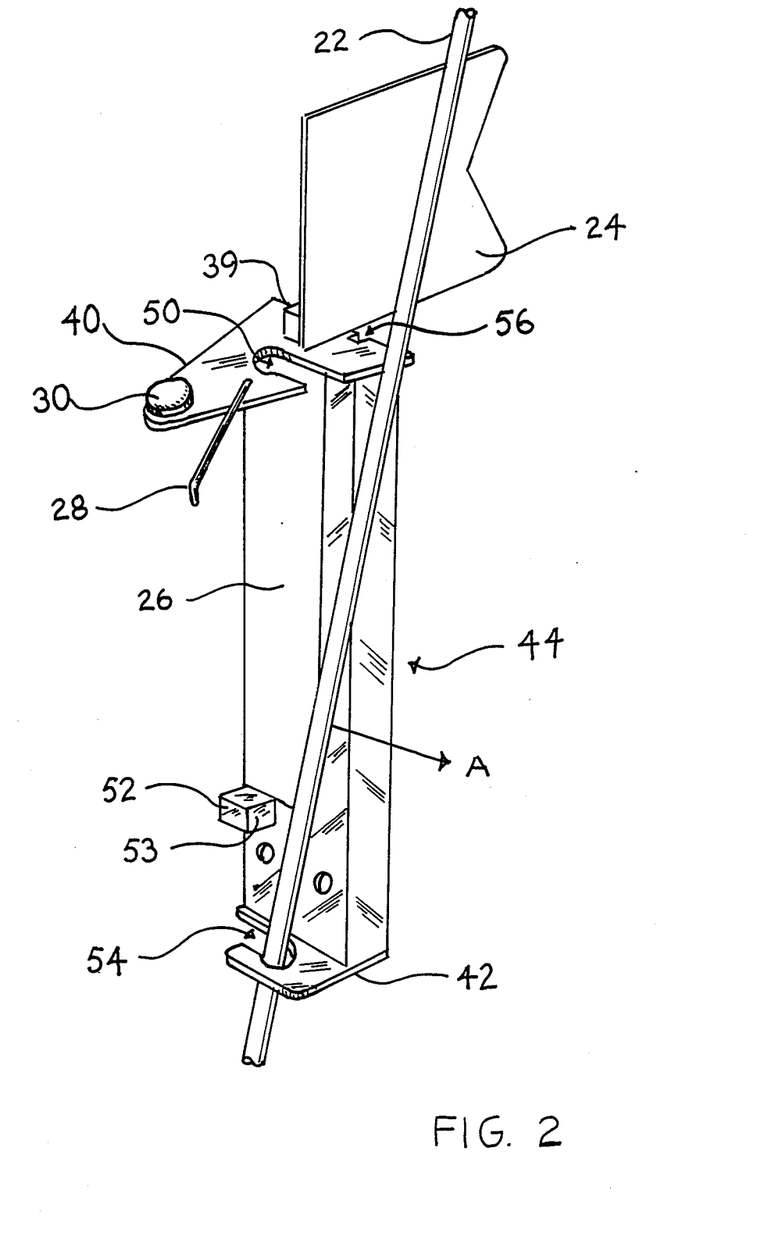
FIGS. 2 and 3 are perspective views showing the wind meter of FIG. 1 from above, front, left side, illustrating how the wind meter can be mounted on, or removed from, the wire or rod around which it is to rotate.
Figure 3:
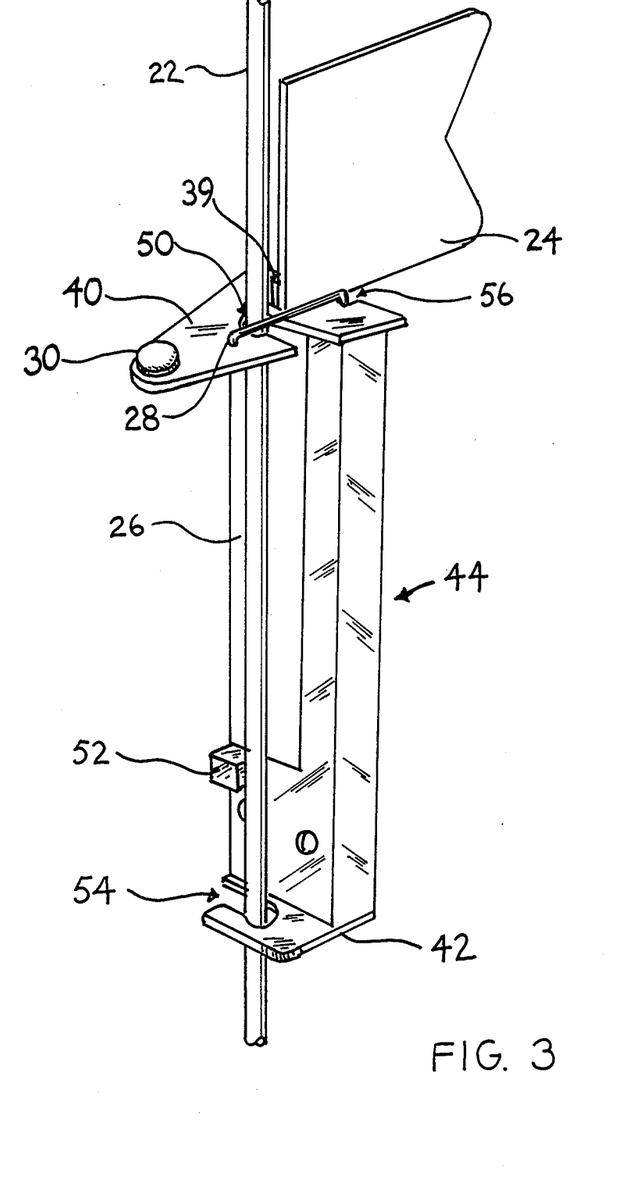

Referring to FIGS. 2 and 3, it will be explained how the wind meter 20 is mounted upon the wire or rod 22. FIGS. 2 and 3 are substantially identical except for the position of the locking pin 28 and the shroud wire 22. In FIG. 2 the locking pin 28 is in an open position, which lets the wire 22 move in or out of the top plate wire opening 50. When the wire moves in the direction indicated by arrow A in FIG. 2, it will become sufficiently free of the retaining tab 52 to be removed out of the bottom-plate wire opening 54, thus totally freeing the wire from the wind meter.

On the other hand, when it is desired to insert the wind meter on the wire, the wire is inserted into the bottom-plate wire opening 54. It is then moved around the retaining tab 52 so that side 53 of that tab, shown in FIG. 2, faces it. Then the wire is placed into the top-plate wire opening 50, and the locking pin 28 is moved into the position shown in FIG. 3, so as to lock the wind meter in place around the wire. The top plate 40 has a locking indentation 56 designed to lock the pin 28 in place once the locking pin has its movable end placed in that indentation.

Figure 4:
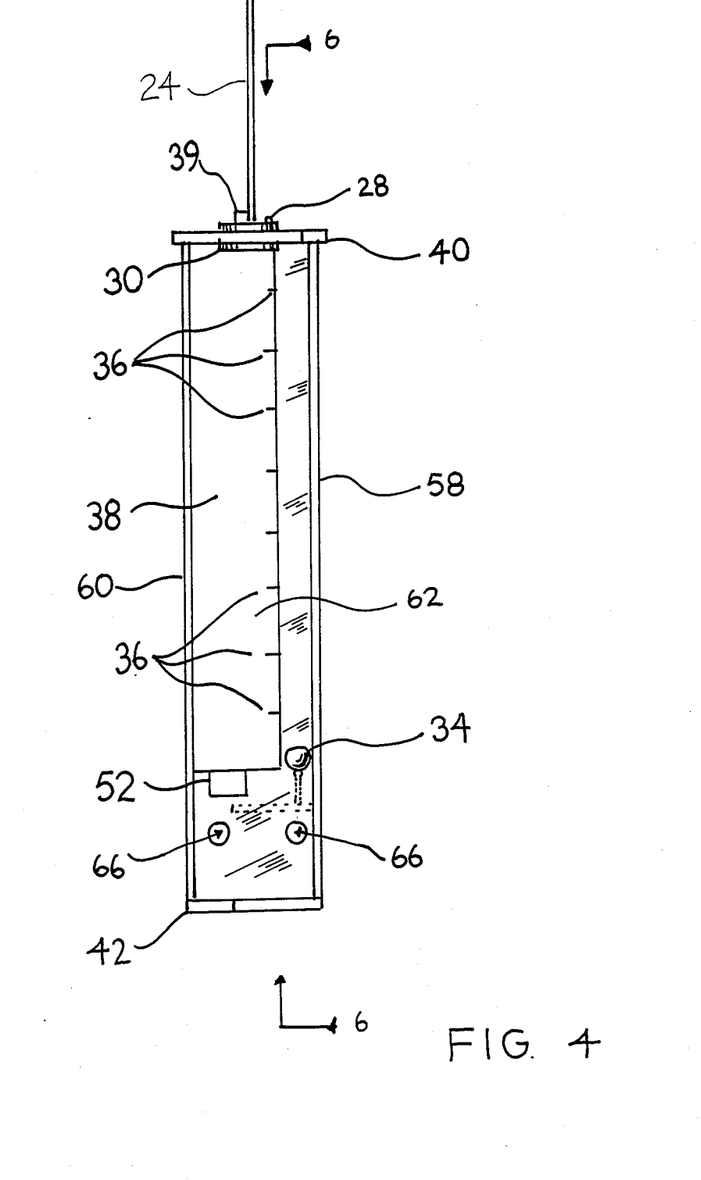
FIG. 4 is a front view of the wind meter of FIG. 1, when it is not mounted on a wire or rod.

Referring now to FIG. 4, a front view of the wind meter 20 is shown. The main body 44 of the wind meter is formed of a box consisting of the top and bottom plates 40 and 42, two side plates 58 and 60, and a front plate 62 and a back plate 64 (shown in FIG. 5). The front plate 62 contains two inlet openings 66 near its bottom. These are designed to let a portion of the air flow to be measured to flow into the body of the wind meter. A large portion of the front surface of the main body of the wind meter is covered with paint 38, so that the vision of people reading the wind meter will not be distracted by light reflecting off of the internal structure of the meter which is covered by that paint. Although it is not shown in the figures, the portion of the back surface of the wind meter directly beneath that part of the front surface which is painted is also covered with paint and calibration marks. It is preferred that the side plate 58 also have calibration marks, so that one viewing the wind meter from the side can read the wind velocity, although such side calibration marks are not shown in the drawings for purposes of simplicity.

Figure 5:
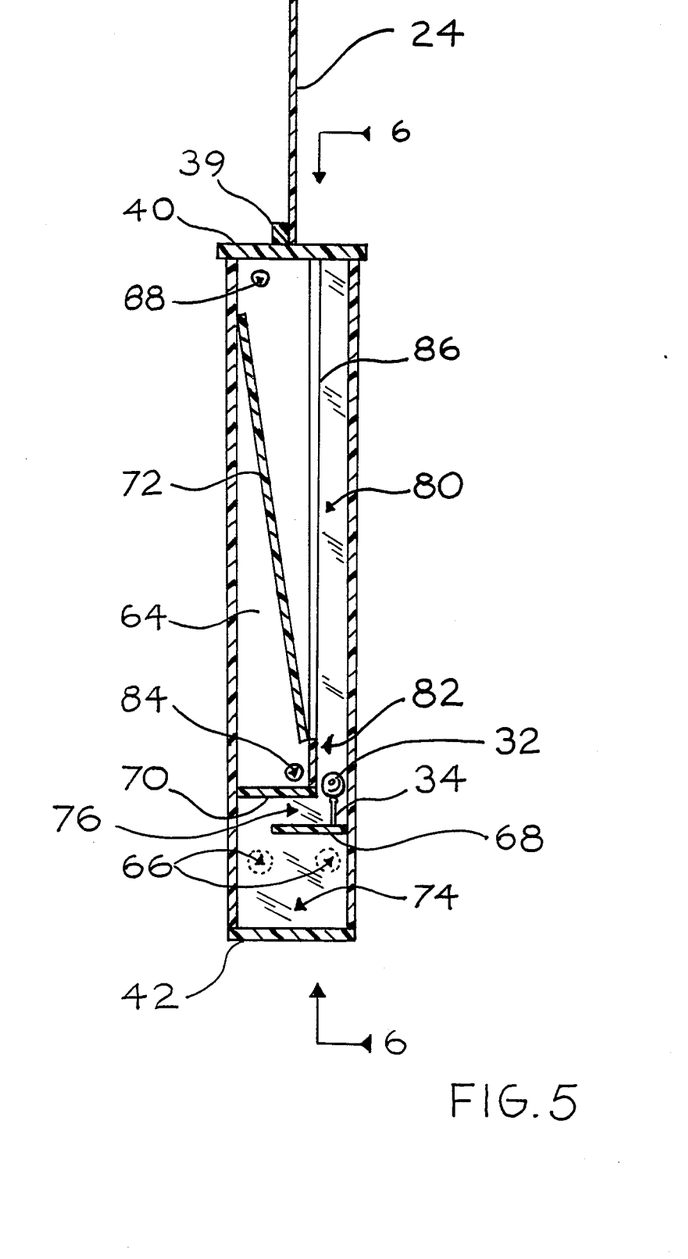
FIG. 5 is a cross-sectional view of the wind meter of FIG. 1 taken from the front along the line 5—5 shown in FIG. 1.
Figure 6:
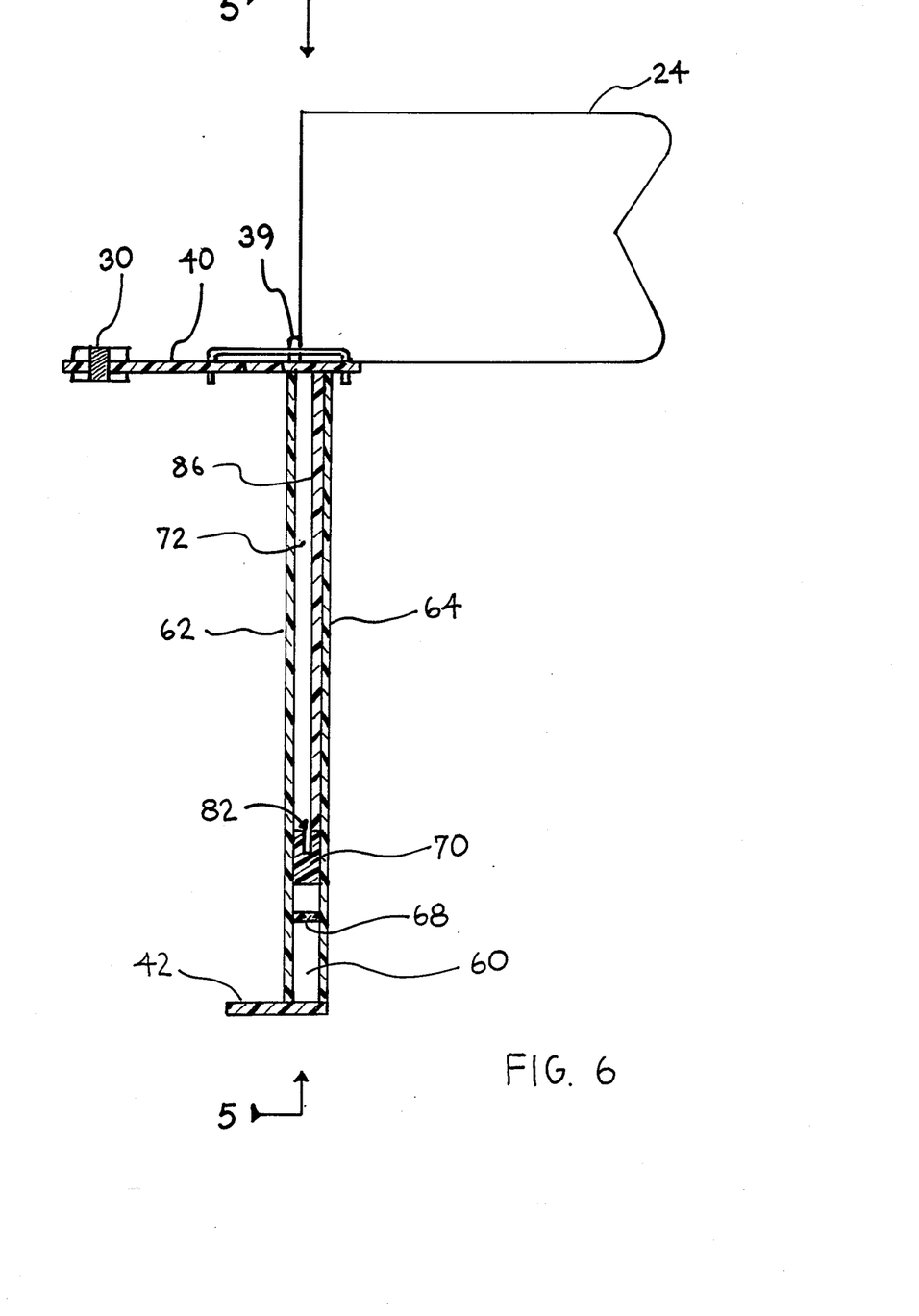
FIG. 6 is a cross-sectional view of the wind meter of FIG. 1 taken from the same side as FIG. 1 along the line 6—6 shown in FIG. 5.

Referring now to FIGS. 5 and 6, the internal structure of the wind meter 20 will be described. FIG. 5 is a cross-section taken along the line 5—5 shown in FIG. 1. This cross section shows a plurality of flow guides which extend all the way between the front and back plates of the wind meter, for the purpose of directing the flow of air which passes in through the inlet openings 66, shown in dotted lines in FIG. 5. These guides include the bottom flow guide 68, the L-shaped flow guide 70, and the increasing-cross-section flow guide 72.

The bottom flow guide 68 provides a baffle between the flow receiving chamber 74 at the bottom of the main body of the flowmeter and the passageway 76 leading to the bottom end of the float chamber 80. This baffle decreases the chance that rain will enter the float chamber and makes the wind meter less affected by rapid fluctuations in wind flow. The L-shaped flow guide 70 forms part of the passageway 76 with the guide 68. The lowest part of its vertical L portion helps defines the bottom, or first part of the float chamber 80. As is shown in FIG. 6, this vertical part of the L guide 70 has an intermediate opening 82 located in its top portion. This lets a portion of the air flow that enters the inlet openings 66 exit from the float chamber through opening 82 and then exit the flowmeter through the intermediate opening's exit hole 84, which is located in the back plate 64 of the wind meter.

The increasing-cross-section flow guide 72 causes the cross section of the float chamber 80, taken in a plane perpendicular to the generally vertical extent of the float chamber, to increase as one moves up the float chamber. The float chamber has a float guide 86, which is comprised of a relatively thin strip of plastic which extends less than half way from the back plate 64 toward the front plate 62, as is shown in FIG. 6. This guide holds the spherical float 32 in a linear path within the float chamber, but it does not prevent air from flowing past the float in that part of the float chamber which is between the guide and the increasing-cross-section flow guide 72. An outlet opening 88 is located in the back plate 64 at the top end of the float chamber 80. The outlet opening 88 provides an exit for air flowing up the float chamber.

The float 32 is made of expanded polystyrene, and is painted with paint containing acrylic resin. This paint makes the position of the float easier to see from the outside of the wind meter. It also provides an acrylic coating on the surface of the float which makes that surface harder and which reduces the float's tendency to pick up electrostatic charge. It is desirable to prevent the float from picking up such charge, since it would tend to make the float stick to the sides of the float chamber, decreasing the wind meter's accuracy. A float supporting pin 34 is located on the top surface of the bottom flow guide 68 to prevent the float from falling out of the bottom end of the float chamber.

In operation, when wind blows in the inlet openings 66, it pushes up through the passageway 76 into the bottom end of the float chamber 80. This air pushes up against the float 32, by a force which is a function of the difference in the air pressure below the float and that above it. This difference is a function both of the amount of air flowing past the float, and the cross-sectional area in which that air has to flow around the float. If the float is pushed upward this difference in air pressure will start to decrease as the cross-sectional area of the chamber gets wider and wider. Gravity pushes down on the float. For a given flow of wind, the float will tend to be pushed upward until it reaches a vertical position in which there is enough area for the wind to blow around the float so that the force created by the net difference in air pressure equals the force of gravity pushing down on the float. At this vertical position the float reaches an equilibrium, which causes its position to remain relatively constant for a given wind speed, enabling its position to be read by reference to the calibration markings 36.

It takes relatively little wind to lift the float 32 up to the intermediate opening 82. The float chamber is quite narrow in its lower part, so that there is relatively little area for air to flow around the float, tending to make the net pressure pushing up on the float from any wind passing through the float chamber quite high. In addition, the portion of the chamber below the intermediate opening 82 has more air flowing through it than the portion of the chamber above opening 82. The bottom portion has both the air which passes out though intermediate opening 82 and the outlet opening 88 flowing through it, whereas the portion of the float chamber above the intermediate opening 82 only has the air which passes out through the outlet opening 88 flowing through it. Thus the bottom part of the float chamber is better for measuring slight winds, and the upper part is better for measuring higher winds.

Figure 7:
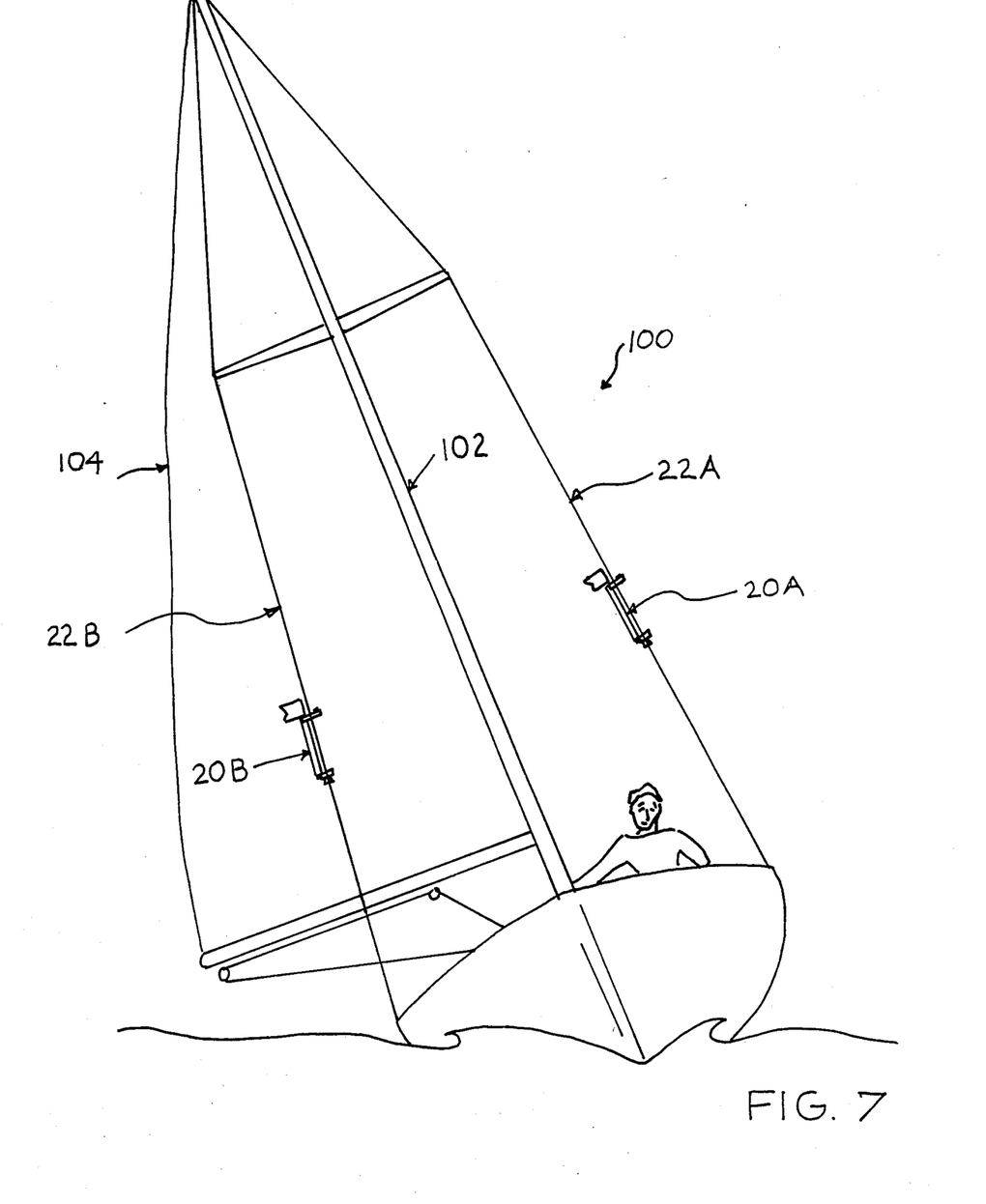
FIG. 7 is a schematic representation of two wind meters of the general type shown in FIG. 1 mounted on the shrouds of a small sailboat.

Referring now to FIG. 7, a sailboat 100 is shown, having a mast 102, and two mast supporting shrouds 22A and 22B. A separate wind meter 20A and 20B of the type previously described are placed on the shrouds 22A, and 22B, respectively. The only difference between the meters 20A and 20B is that they are mirror images of each other when viewed from the front, as shown in FIG. 4. The wind meter 22A placed on the port shroud is identical to the meter 20 described previously, having its float on the right side when looking at its front, the direction from which the view of FIG. 4 is taken, and the direction from which the meter will be seen when it is rotatably mounted on a shroud and viewed from upwind. Wind meter 22B, on the other hand, has its float 32 on the left hand when viewed from its front, upwind direction.

Each of the wind meters 20A and 20B is designed so that the entire float can be viewed from an upwind direction, even when the meter is rotatably mounted on a wire having the maximum diameter which will fit in the wire encircling surfaces of the top plate wire opening 50 and the bottom plate wire opening 54. In other embodiments the flqat chamber may be less offset to the side, but preferably it is sufficiently offset that at least the center of the float can be seen from a distance of a foot or more in the upwind direction when the meters is mounted to rotate about such a maximum diameter wire.

The wind meter 20A, which is rotatably mounted on the port shroud 22A, has its float 32 located on the right side when viewed from the upwind direction. This causes the float to be visible from the rear of the sailboat 100 where its cockpit is when the wind is blowing from all directions except the starboard, in which case the mainsail will tend to be blown to the port side, blocking the view of that wind meter and making the wind meter 20B visible instead. Similarly the wind meter 20B, which is rotatably mounted on the starboard shroud 22B, has its float 32 located on the left side when viewed from the upwind direction, so its float is visible from the cockpit when the wind is blowing from all directions except the port, in which case the mainsail will tend to be blown to the starboard, blocking the view of the wind meter 20B and making the wind meter 20A visible. Thus it can be seen that the use of the two mirror image wind meters tends to keep the float of at least one such wind meter visible to the cockpit, regardless of the angle of the wind and the position of the mainsail.

Figure 8:
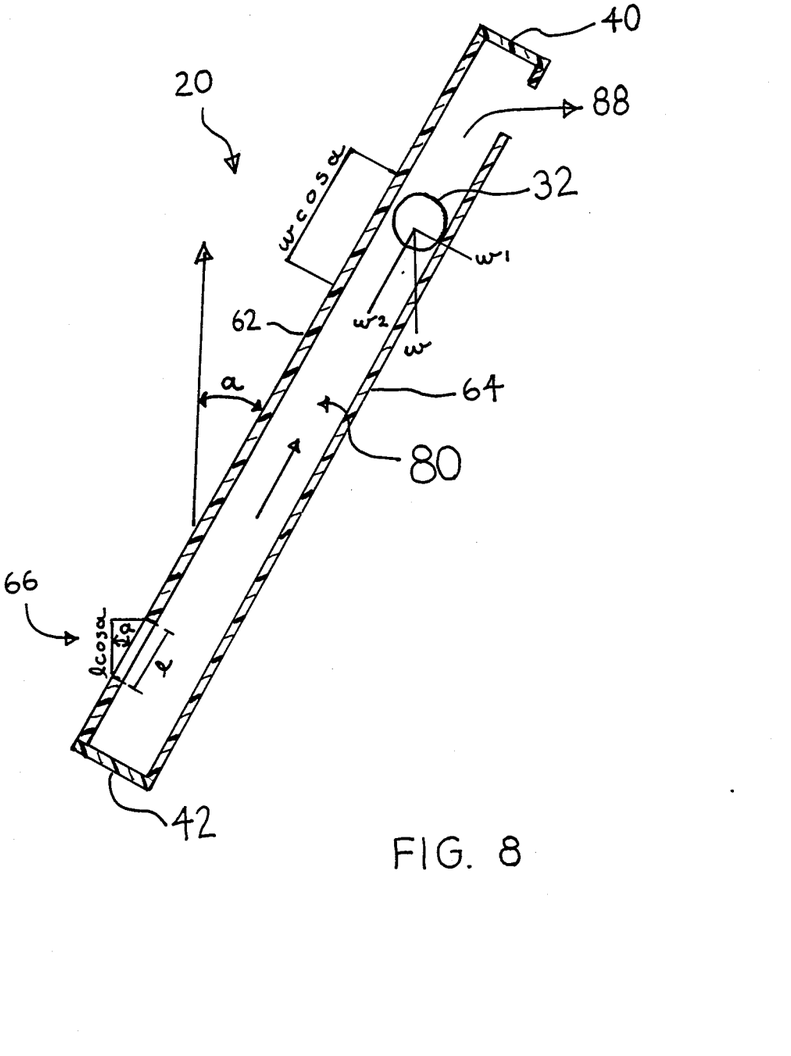
FIG. 8 is a simplified schematic representation of a wind meter shown in FIG. 1, used to illustrate how the meter automatically tends to compensate for the tilting of such a meter.

Referring now to FIG. 8, a simplified schematic diagram of the wind meter will be used to explain how the meter tends to compensate for a component of the tilting that takes place when the shroud to which it is attached slants away from the vertical. This is important, since the shrouds of a sailboat slant as the sailboat heels to one side or the other in response to the wind.

As can be seen from FIG. 8, when the major axis of the flowmeter 20 is tilted by an angle "a" away from the vertical in a direction parallel to the direction of the wind, the force of gravity still pulls down upon the float 32 with the weight "w" of the float in a vertical direction. But this vertical gravitational force can be treated as being made up of two perpendicular components, a component "w1" perpendicular to the upward flow of air in the float chamber, and a component "w2" which is parallel to that flow. The component "w1" perpendicular to the flow will be offset by an equal and opposite supporting force from the back plate 64 of the wind meter. Thus the downward force "w2" which has to be countered by a flow of wind in the tilted float chamber is less than the force "w" that it would have to counter if the float chamber were vertical. Unless this decrease were compensated for, it would tend to make the calibration marks 36 quite inaccurate when the wind meter were tilted in a direction away from the wind.

Experiments conducted by the inventor, however, indicate that the decrease in accuracy as the wind meter is tilted in such a direction is less than might be expected. The experiments indicate this results because the projection of the inlet openings 66 onto a plane perpendicular to a horizontal wind flow also decreases by approximately the same factor, cosine of angle "a", as does the force of gravity pushing against the wind in the float chamber as the wind meter is tipped. For this decrease in the projected area of the inlet openings to have much effect, it is important that the area of the inlet opening not be much larger than the narrowest cross-sectional area of the float chamber. Otherwise the narrowest cross section of the float chamber would limit the flow through that chamber, not the projected area of the inlet opening, and, thus, decreases in that projected area due to tilting of the wind meter would not cause a noticeable decrease in the air flow in the float chamber.

The foregoing description and the drawings are given merely to explain and illustrate the invention, and the invention is not to be limited thereto, except insofar as the appended claims are so limited, since those skilled in the art who have the disclosure before them will be able to make modifications and variations therein without departing from the scope of the invention.

For example, it should be understood that in alternate embodiments of the invention the flowmeter could be made from injected molded parts. It should also be understood that the flowmeter of the present invention is not limited to use on the shroud of a sailboat, but could be used in other situations where it would be convenient to have a float-type flowmeter measure flows which come from a plurality of directions. For example, the flowmeter of the present invention might by mounted to rotated about other structures besides wires, cables or rods. It could even be designed so that its float tube is stationary and only its inlet openings, which would be connected by tubing to the bottom end of its float chamber, would be rotated by a deflections surface such as a fin to point those inlet openings into the wind.

What we claim is:

1. A float-type flowmeter for measuring the rate of a given flow of fluid, said meter being of the type having:
    a float chamber extending between a first end and a second end, the cross-sectional area of which chamber in the plane perpendicular to the path between said first and said second ends increases as that path advances toward said second end;

an inlet opening for receiving a sampled portion of said flow of fluid, so that when said inlet opening is faced into said flow, the rate of flow in said sampled portion increases with increases in the rate of flow of said fluid;

means for channeling said sampled portion of said flow into said first end of said float chamber;

an outlet opening for releasing at least a part of said sampled portion of flow from said second end of said chamber;

a float, located in said float chamber, shaped to move between said first and second ends of said chamber, said float being pulled by gravity toward the first end of the chamber when the second end is placed above the first end, and being pushed toward said second end by said sampled portion of said flow, so that said float will tend to reach an equilibrium position when the force of gravity pushing the float down toward the first end equals the force of the net pressure of the sampled flow pushing the float up toward the second end, which net pressure tends to decrease as the cross-sectional area of said chamber increases;

flow rate indicating means, which associate each of a plurality of positions between the first and second ends of said float chamber with the corresponding rate of flow of said fluid required for said float to reach a sustained equilibrium at said position when said inlet opening is faced into said flow;

the improvement which comprises:

means for rotatably mounting said inlet opening so that it can be rotated to face into said flow;

a rotatably mounted deflection surface, mounted so it can be deflected by said flow so as to minimize its resistance to said flow; and means for mechanically linking said deflection surface and said inlet opening so that when said deflecting surface is rotated so as to minimize its resistance to said flow, said inlet opening faces into said flow.

2. A flowmeter as in claim 1, wherein said float chamber, said inlet opening and said deflection surface are all constructed and connected so as to rotate as one unit, so that said means for rotatably mounting said inlet opening also rotatably mounts said float chamber and said deflection surface.

3. A flowmeter as in claim 2, wherein said means for rotatably mounting includes means for mounting said float chamber, said inlet opening and said deflection surface so as to rotate on and around the axis of a structure which is elongated in a direction having a vertical component.

4. A flowmeter as in claim 3, wherein said means for mounting includes means for mounting said float chamber, said inlet opening and said deflection surface so as to rotate on and around an elongated structure which is a mast supporting wire of a boat.

5. A flowmeter as in claim 4, further including said mast supporting wire about which said flowmeter is rotatably mounted.

6. A flowmeter as in claim 5, wherein said mast supporting wire is the shroud of a sailboat.

7. A flowmeter as in claim 3, wherein:

said means for rotatably mounting includes means for mounting said float chamber on one side of said elongated structure; and between 30 and 70 percent of the weight of said flowmeter is located on the other side of said elongated structure from said float chamber so that even if the axis of said elongated structure about which the flowmeter is rotatably mounted is tilted toward a horizontal direction, the weight on the opposite side of the elongated structure from said float chamber which make it easier for the flowmeter to rotate about said elongated structure.

8. A flowmeter as in claim 3, wherein said float chamber and the majority of said deflection surface are mounted on the same side of said elongated structure, so that when said flowmeter is placed in a flow of fluid the majority of said deflection surface and the float chamber are both rotated to the downstream side of said elongated structure.

9. A flowmeter as in claim 3, wherein:

said float chamber is comprised of an elongated chamber which has an axis designed to extend in a direction parallel to the elongated structure about which said flow meter is designed to be mounted;

said inlet opening is comprised of one or more openings, each of fixed area, the projection of which into the direction of a horizontal flow is maximized when the axis of said float chamber is vertical, and decreases as the axis of said float chamber tilts toward the horizontal, with the total area of said openings being sufficiently small relative to the narrowest cross section of said float chamber that when the float chamber is tilted, the decrease of the projected area of those openings into the horizontal flow is sufficient to make a noticeable decrease in the sampled flow in said float chamber.

10. A flowmeter as in claim 3, wherein:

said float chamber is comprised of an elongated chamber which has a linear float path and means for constraining said float to move along said float path;

said float chamber is position relative to said means for rotatably mounting so that said linear float path is parallel to the axis of said elongated structure when said flowmeter is mounted upon said structure;

said means for rotatably mounting includes encircling surfaces for at least partially encircling said elongated structure and for holding said flowmeter to said elongated structure when it is rotatably mounted on said structure, said encircling surfaces having dimensions which limit the diameter of the elongated structure about which the flowmeter can be mounted to a maximum encircled diameter; and said float chamber, said encircling surfaces, and said deflection surface are positioned relative to each other so that when said flowmeter is mounted on and around a given portion of an elongated structure having a maximum diameter no greater than said maximum encircled diameter, and said deflection surface is deflected by a flow flowing in a given direction so as to minimize its resistance to that flow, the center of the float, when it is in said float path, will not be directly downstream in said flow of any part of said portion of said elongated structure, so that if a person is looking at said flowmeter from a direction directly upstream, at a distance of a foot or more, said center of said float will not be obscured by said elongated structure.

11. A flowmeter as in claim 10, further including a shroud of a sailboat about which said flowmeter is rotatably mounted.

12. A flowmeter for measuring the rate of a given flow of fluid, said meter being of the type having:

a float chamber extending between a first end and a second end, the cross-sectional area of which chamber in the plane perpendicular to the path between said first and second ends increases as that path advances toward said second end;

an inlet opening for receiving a sampled portion of said flow of fluid;

means for channeling said sampled portion of said flow into said first end of said float chamber;

an outlet opening for releasing at least a part of said sampled portion of flow from said second end of said chamber;

a float, located in said float chamber, shaped to move between said first and second ends of said chamber, said float being pulled by gravity toward the first end of the chamber when the second end is placed above the first end, and being pushed toward said second end by said sampled portion of said flow, so that said float will tend to reach an equilibrium position when the force of gravity pushing the float down toward the first end equals the force of the net pressure of the sampled flow pushing the float up toward the second end, which net pressure tends to decrease as the cross-sectional area of said chamber increases;

characterized in that the flowmeter comprises:

an intermediate opening located in said float chamber between its first and second ends for releasing from said float chamber a part of said sampled portion of said flow which is not released through said outlet opening, said intermediate opening being located in said float chamber so as to divide said float chamber into two parts, a first part between the first end of said chamber and said intermediate opening through which all of the sampled portion which flow through both the intermediate opening and the outlet opening flow, and a second part between said intermediate opening and said outlet opening through which that part of the sampled portion which flows through the intermediate opening does not flow, so that a given sampling flow will tend to push up harder against the float in said first part of said float chamber than in said second part of said float chamber.

13. A float-type flowmeter for measuring the rate of a given flow of fluid, said meter being of the type having:

a float chamber extending between a first end and a second end, the cross-sectional area of which chamber in the plane perpendicular to the path between said first and second ends increases as that path advances toward said second end;

an inlet opening for receiving a sampled portion of said flow of fluid, so that when said inlet opening is faced into said flow, the rate of flow in said sampled portion increases with increases in the rate of flow of said fluid;

means for channeling said sampled portion of said flow into said first end of said float chamber;

an outlet opening for releasing at least a part of said sampled portion of flow from said second end of said chamber;

a float, located in said float chamber, shaped to move between said first and second ends of said chamber, said float being pulled by gravity toward the first end of the chamber when the second end is placed above the first end, and being pushed toward said second end by said sampled portion of said flow, so that said float will tend to reach an equilibrium position when the force of gravity pushing the float down toward the first end equals the force of the net pressure of the sampled flow pushing the float up toward the second end, which net pressure tends to decrease as the cross-sectional area of said chamber increases;

flow rate indicating means, which associate each of a plurality of positions between the first and second ends of said float chamber with the corresponding rate of flow of said fluid required for said float to reach a sustained equilibrium at said position when said inlet opening is faced into said flow;

the improvement which comprises:

a rotating structure in which said inlet opening is located;

means for rotatably mounting said rotating structure so said inlet opening can be rotated to face into said flow, said means for rotatably mounting said rotating structure including means for mounting said rotating structure for rotation about an elongated structure which is elongated in a direction having a vertical component;

a deflection surface, mounted on said rotating structure for rotation with that structure, so that when said flowmeter is placed in a flow, said rotating structure is rotated so as to minimize the deflection surface's resistance to said flow, said deflection surface being position relative to said rotating structures so that when said deflection surface is positioned to minimize its resistance to said flow, said inlet opening faces into said flow;

said rotating structure being designed so that between 30 to 70 percent of the combined weight of said rotating structure and said deflection surface is located on the other side of the axis of rotation of said rotating structure from said inlet opening, so that even if the axis of rotatation is tilted toward a horizontal direction, the relatively even weight on the opposite side of said axis of rotation makes it easier for the rotating structure to rotate about said elongated structure so as to face said inlet opening into the flow.

* * * * *